US012578282B2

(12) United States Patent
Han

(10) Patent No.: US 12,578,282 B2
(45) Date of Patent: Mar. 17, 2026

(54) APPARATUS AND METHOD FOR INSPECTING A GLASS SHEET

(71) Applicant: CORNING INCORPORATED, Corning, NY (US)

(72) Inventor: Tae-hun Han, Asan-si (KR)

(73) Assignee: CORNING INCORPORATED, Corning, NY (US)

( * ) Notice: Subject to any disclaimer, the term of this patent is extended or adjusted under 35 U.S.C. 154(b) by 220 days.

(21) Appl. No.: 16/969,775

(22) PCT Filed: Feb. 8, 2019

(86) PCT No.: PCT/US2019/017310
§ 371 (c)(1),
(2) Date: Aug. 13, 2020

(87) PCT Pub. No.: WO2019/160769
PCT Pub. Date: Aug. 22, 2019

(65) Prior Publication Data
US 2020/0408698 A1 Dec. 31, 2020

(30) Foreign Application Priority Data
Feb. 13, 2018 (KR) ........................ 10-2018-0017948

(51) Int. Cl.
*G01N 21/896* (2006.01)
(52) U.S. Cl.
CPC .................................. *G01N 21/896* (2013.01)
(58) Field of Classification Search
CPC ............. G01N 21/896; G01N 21/8806; G01N 21/8965
See application file for complete search history.

(56) References Cited

U.S. PATENT DOCUMENTS 7,613,355 B2 * 11/2009 Hirano ...................... G06T 7/12
382/199
7,800,749 B2 * 9/2010 LeBlanc .............. G01N 21/896
356/239.8
(Continued)

FOREIGN PATENT DOCUMENTS

CN 101086444 A 12/2007
CN 101115988 A 1/2008
(Continued)

OTHER PUBLICATIONS

Lee H-W, Liu CH, Chen J-S. Development of a High Precision Edge Alignment System for Touch-Panel Glass Substrates. Advances in Mechanical Engineering. Jan. 2014. doi: 10.1155/2014/904061 (Year: 2014).*
(Continued)

*Primary Examiner* — Rebecca C Bryant
(74) *Attorney, Agent, or Firm* — Kevin M. Able; F. Brock Riggs

(57) ABSTRACT

An apparatus and method for inspecting an edge of a glass sheet are disclosed. The apparatus includes an optical system including a light source arranged to illuminate an edge portion of a glass sheet in a direction oblique to the glass sheet and a camera arranged to take an image of the edge portion, and an image processing device configured to process an image of the glass sheet received from the camera to detect an edge defect of the glass sheet. The method includes acquiring an image of a glass sheet, detecting an edge line of the glass sheet from the image, detecting a reference line from the edge line, and detecting an edge defect of the glass sheet by comparing the edge line and the reference line.

7 Claims, 17 Drawing Sheets

(56)        References Cited

U.S. PATENT DOCUMENTS

| | | | | | |
|---|---|---|---|---|---|
| 9,361,538 | B2 * | 6/2016 | Hummel | ............. | G06V 10/757 |
| 9,568,436 | B2 * | 2/2017 | Wootton | ........... | G01N 21/8806 |
| 2007/0115463 | A1 | 5/2007 | Dureiko | | |
| 2016/0334326 | A1 | 11/2016 | Sapiens et al. | | |

FOREIGN PATENT DOCUMENTS

| | | | | |
|---|---|---|---|---|
| CN | 101360985 | A | | 2/2009 |
| CN | 101900691 | A | | 12/2010 |
| CN | 107664646 | A | | 2/2018 |
| JP | 2002-214157 | | * | 1/2002 |
| JP | 2002-214157 | A | | 7/2002 |
| JP | 2005-156254 | A | | 6/2005 |
| JP | 2011-085494 | A | | 4/2011 |
| JP | 4747602 | B2 | | 8/2011 |
| JP | 2012-107952 | A | | 6/2012 |
| JP | 2012-132811 | A | | 7/2012 |
| KR | 20020625222 | | * | 4/2002 |
| KR | 10-2008-0041406 | A | | 5/2008 |
| KR | 10-0835537 | B1 | | 6/2008 |
| KR | 10-0902709 | B1 | | 6/2009 |
| KR | 10-0951461 | B1 | | 4/2010 |
| KR | 10-1019831 | B1 | | 3/2011 |
| KR | 101019831 | | * | 3/2011 |
| KR | 10-1412132 | B1 | | 6/2014 |
| KR | 10-2017-0071978 | A | | 6/2017 |
| TW | M446678 | U | | 2/2013 |
| WO | WO-2012105449 | A1 | * | 8/2012 ........... G01N 21/896 |

OTHER PUBLICATIONS

International Search Report and Written Opinion of the International Searching Authority; PCT/US2019/017310; Mailed May 27, 2019; 12 Pages; Korean Patent Office.

Chinese Patent Application No. 201980016704.9, Office Action, dated Feb. 7, 2023, 6 pages Chinese Patent Office.

Taiwanese Patent Application No. 108104778, Office Action, dated Oct. 25, 2022, 8 page; Taiwanese Patent Office.

Japanese Patent Application No. 2020-543056, office action dated Feb. 1, 2023, 24 pages (12 pages of English Translation and 12 pages of Original Document), Japanese Patent Office.

Korean Patent Application No. 10-2018-0017948, Korean Office Action, dated Jul. 12, 2022, 14 pages (8 pages of English Translation and 6pages of Original Copy); Korean Patent Office.

* cited by examiner

400

APPARATUS AND METHOD FOR INSPECTING A GLASS SHEET

CROSS-REFERENCE TO RELATED APPLICATION

This application is a national stage application under 35 U.S.C. § 371 of International Application No. PCT/US2019/017310, filed on Feb. 8, 2019, which claims the benefit of priority of Korean Patent Application Serial No. 10-2018-0017948 filed on Feb. 13, 2018 the contents of which are relied upon and incorporated herein by reference in their entirety as if fully set forth below.

BACKGROUND

The disclosure relates to an apparatus and method for inspecting a glass sheet, and more particularly, to an apparatus and method for inspecting an edge portion of a glass sheet.

Glass sheets may be manufactured by melting raw materials to form molten glass, forming the molten glass into a glass ribbon, and cutting the glass ribbon into glass sheets of an appropriate size. In some circumstances the glass sheet cut from the glass ribbon may be further processed, for example by cutting the glass sheets again into smaller predetermined sizes depending on the intended use, polishing edges of the cut glass sheets, washing the cut glass sheets, and the like. These processes often require transportation of the glass sheets from one location to another location. Unfortunately, a defect may be formed at an edge of a glass sheet during the cutting process. When a glass sheet comprises a defect at its edge, the glass sheet may be broken into many pieces during subsequent processing, including during transportation. To remove the pieces of glass from a transport device, it may be necessary to stop the transport device, and processing may be delayed.

SUMMARY

The disclosure describes an apparatus and method for inspecting an edge of a glass sheet for defects.

According to an aspect of the disclosure, an apparatus for inspecting an edge of a glass sheet is disclosed, the apparatus comprising an optical system comprising a light source arranged to illuminate an edge portion of a glass sheet, for example in a direction oblique to the glass sheet, and a camera arranged to acquire an image of the edge portion. The apparatus further comprises an image processing device configured to process an image of the glass sheet received from the camera to detect an edge defect of the glass sheet.

According to one or more embodiments, the apparatus may further comprise a transport device configured to convey the glass sheet, and the optical system is arranged on one side of the transport device.

According to one or more embodiments, the camera may have a tilting portion configured to adjust an orientation of a plane of focus of the camera such that the plane of focus of the camera is parallel to the glass sheet.

According to one or more embodiments, the camera may be oriented so that a plane of focus of the camera is parallel to the glass sheet.

According to one or more embodiments, the optical system may further comprise a first mirror, the first mirror and the camera oriented so that a plane of focus of the camera is parallel to the glass sheet.

According to one or more embodiments, the optical system may still further comprise a second mirror, the second mirror and the light source oriented so that light emitted from the light source is reflected by the second mirror and incident on the glass sheet, for example in the direction oblique to the glass sheet.

According to one or more embodiments, the camera may comprise a telecentric lens, and the light source may comprise a telecentric light source.

According to another aspect of the disclosure, a method of inspecting an edge of a glass sheet is described, the method comprising acquiring an image of a glass sheet, detecting an edge line of the glass sheet from the acquired image, detecting a reference line from the edge line, and detecting an edge defect of the glass sheet by comparing the edge line and the reference line.

According to one or more embodiments, the acquiring the image of glass sheet may comprise acquiring a plurality of partial images of portions of the glass sheet, for example a plurality of edge portions.

According to one or more embodiments, the detecting the edge line may comprise detecting each of partial edge lines from each of the partial images.

According to one or more embodiments, the detecting the edge line may further comprise combining the plurality of partial edge lines into one edge line.

According to one or more embodiments, the detecting the reference line may comprise applying line fitting to the edge line.

According to one or more embodiments, the line fitting may employ random sample consensus.

According to one or more embodiments, the edge line may correspond to one of a plurality of edges of the glass sheet.

According to one or more embodiments, the detecting the edge defect may comprise detecting at least one of a type of the edge defect, a size of the edge defect, and a position of the edge defect.

According to another aspect of the disclosure, a method of inspecting an edge of a glass sheet is disclosed, the method comprising acquiring an image of a glass sheet conveyed by a transport device, detecting an edge line of the glass sheet from the image, and detecting a reference line from the edge line. The method further comprises detecting an edge defect in the glass sheet by comparing the edge line and the reference line, and determining the glass sheet to be defective when a size of the edge defect is larger than a predetermined value.

According to one or more embodiments, the acquiring the image may comprise sequentially acquiring partial images of the glass sheet conveyed by the transport device with a fixed camera at time intervals.

According to one or more embodiments, the method may further comprise stopping conveyance of the glass sheet when the glass sheet is determined to be defective.

According to one or more embodiments, the predetermined value may be dependent on a position of the edge defect.

According to one or more embodiments, the glass sheet may be composed of a plurality of regions, and the predetermined value may be dependent on the region in which the edge defect is present.

According to one or more embodiments, the predetermined value may vary depending on a type of the edge defect.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
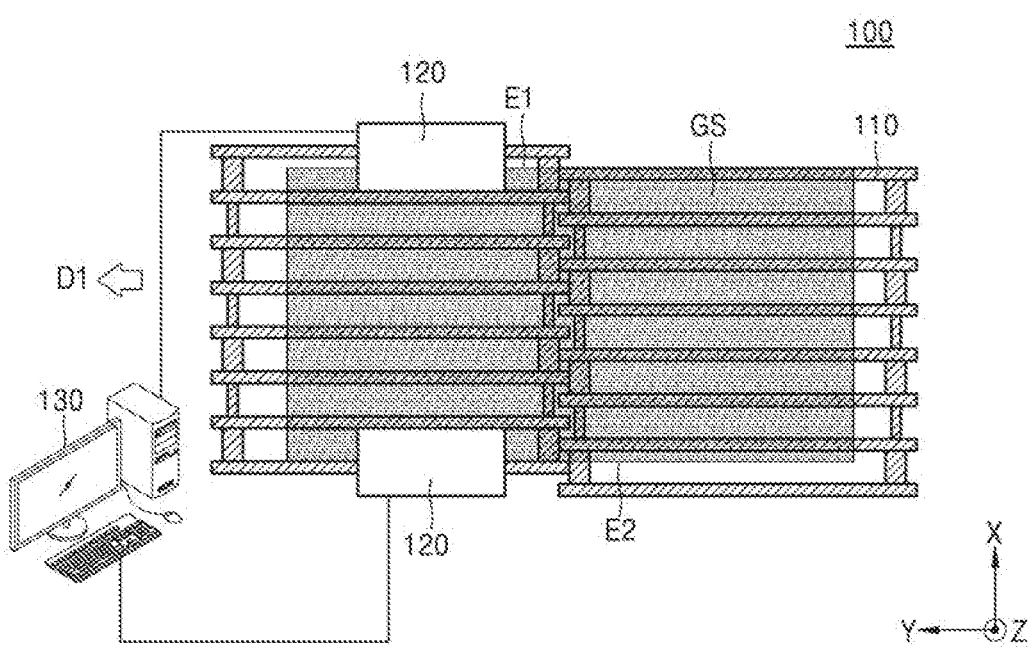
FIG. 1 is a diagram illustrating an apparatus for inspecting an edge of a glass sheet according to an embodiment of the disclosure.

FIG. 1 is a diagram illustrating an apparatus for inspecting an edge of a glass sheet according to an embodiment of the disclosure.

Referring to FIG. 1, an apparatus 100 for inspecting an edge of a glass sheet may comprise a transport device 110, at least one optical system 120, and an image processing device 130.

The transport device 110 may convey a glass sheet GS that has undergone forming and cutting processes in direction D1. The transport device 110 may be a conveyor, for example, a belt conveyor, a chain conveyor, a roller conveyor, or a wheel conveyor. In some embodiments, the glass sheet GS may be loaded on one end of the transport device 110. The transport device 110 may convey the glass sheet GS to the other end of the transport device 110. For example, the transport device 110 may convey the glass sheet GS to a finishing process section.

The optical system 120 is arranged to acquire an image of the glass sheet GS. For example, the optical system 120 may be arranged at a side of the transport device 110 and may be operated to acquire an image of an edge portion of the glass sheet GS which is moved by the transport device 110. According to some embodiments, the glass sheet GS may have a rectangular shape with four edges, although in further embodiments other shapes may be used. It should be noted, however, that the apparatus and method are typically employed to detect defects on an edge of a glass sheet comprising two opposing and parallel edges, the two opposing and parallel edges extending parallel with the conveyance direction D1. Accordingly, in some embodiments, apparatus 100 may comprise two optical systems 120, wherein the two optical systems 120 may be arranged at each of both sides of the transport device 110 and arranged to acquire images of each of the two opposing edges E1 and E2 of the glass sheet GS parallel with the conveyance direction D1. For example, in embodiments, an optical system 120 may have a configuration that will be described below with reference to FIGS. 2A and 2B. The optical system 120 is configured to transmit captured images to the image processing device 130.

The image processing device 130 processes the image received from the optical system 120 to detect an edge defect. For example, the image processing device 130 may detect an edge defect according to methods of inspecting an edge of a glass sheet that will be described below with reference to FIGS. 4 to 9B. The image processing device 130 may be, for example, any suitable processing device, for example a computer. In some embodiments, the image processing device 130 may further comprise a display device that shows a real-time image of the glass sheet GS and an edge inspection result of the glass sheet GS. For example, in some embodiments, the displayed inspection result may be a "fail" result, e.g., as when an edge defect exceeding a predetermined size has been detected. In some embodiments, a "pass" result may be indicated if no edge defect exceeding a predetermined size has been detected.

In some embodiments, the image processing device 130 may further comprise a storage device, for example a digital memory device, that stores the captured image and an edge defect detection result.

Figure 2A:
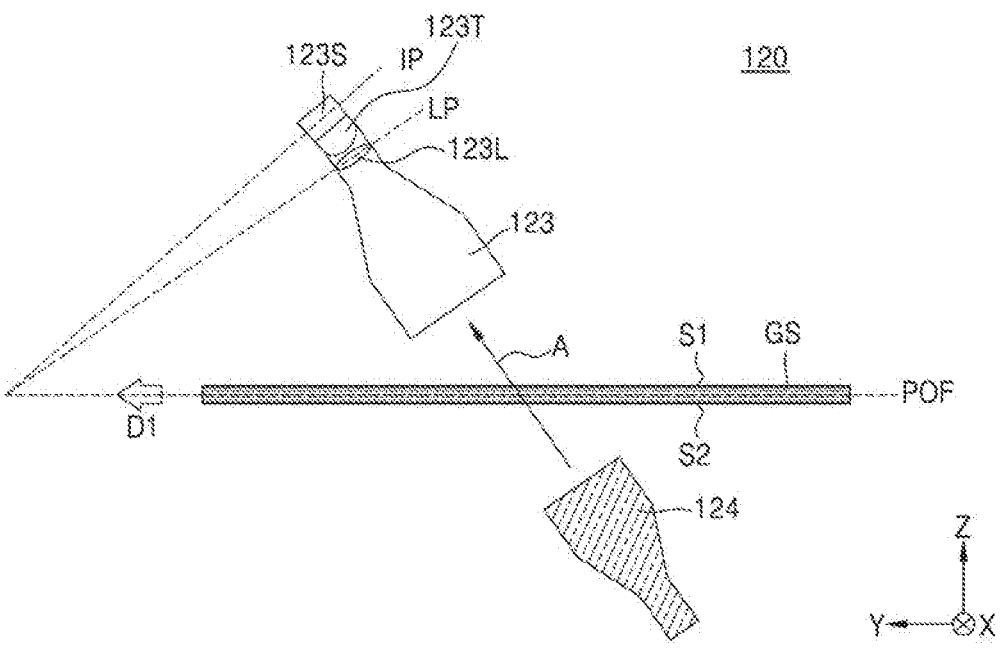
FIG. 2A is a diagram illustrating an optical system comprised in an apparatus for inspecting an edge of a glass sheet according to an embodiment of the disclosure.

FIG. 2A is a diagram illustrating an exemplary optical system 120 according to an embodiment of the disclosure.

The optical system 120 comprises a camera 123 and a light source 124. The light source 124 is arranged to illuminate an edge portion of the glass sheet GS adjacent a longitudinal edge of the glass sheet. Light source 124 is oriented such that light A emitted from the light source is incident on the glass sheet GS from an oblique direction with respect to the glass sheet GS rather than the Z direction or a parallel Y direction. In other words, the light source 124 may be oriented in an oblique direction with respect to the Z direction or the Y direction parallel to the glass sheet GS. The camera 123 may face the light source 124 with the glass sheet GS positioned therebetween. The camera 123 may be arranged to take images of the edge portion. The camera 123 may also be oriented in an oblique direction with respect to the Z direction perpendicular to the glass sheet GS.

The glass sheet GS comprises two parallel and opposing main surfaces S1 and S2. In addition, an edge of the glass sheet GS comprises a surface extending between two main surfaces S1 and S2. A defective portion of the edge of the glass sheet GS at which a defect is present tends to have a surface extending in a direction perpendicular to the two main surfaces S1 and S2. For example, a defective portion of the edge of the glass sheet GS may have a surface parallel to the Z direction. Thus, a surface of the defective portion of the edge of the glass sheet GS may appear thicker in an image captured using the light source 124 and the camera 123 that are arranged in an oblique direction with respect to the glass sheet GS than in an image captured using the light source 124 and the camera 123 that are arranged in the Z direction perpendicular to the glass sheet GS. When the edge of the glass sheet GS appears to be sufficiently thick in an image, it is easy to detect an edge line from the image of the glass sheet GS. Herein, the edge line denotes a line on an image of the glass sheet GS that corresponds to the edge of the glass sheet GS. Therefore, an edge defect may be detected more accurately by imaging the glass sheet at an oblique angle.

As shown in FIG. 2A, the camera 123 and the light source 124 may be located on opposite sides of the glass sheet GS. For example, the camera 123 may be above the glass sheet GS and the light source 124 may be below the glass sheet GS, but conversely, the camera 123 may be below the glass sheet GS and the light source 124 may be above the glass sheet GS.

The camera 123 may be a monochrome digital camera or a color digital camera. The camera 123 may comprise a lens 123L and a sensor portion 123S. Light passing through the lens 123L arrives at the sensor 123S and is converted into a digital signal by an image sensor of the sensor portion 123S. In some embodiments, the lens 123L may be a compound lens composed of a plurality of sub-lenses. In some embodiments, the camera 123 may further comprise a tilting portion 123T. The tilting portion 123T can be used to adjust an orientation of a plane of focus POF of the camera 123. For example, the tilting portion 123T can be used to adjust the orientation of the plane of focus POF by changing an angle between the lens 123L and the sensor portion 123S. For example, the tilting portion 123T may be rotatable about an X axis. More specifically, the tilting portion 123T can be used to adjust the orientation of the plane of focus POF according to the Scheimpflug principle by adjusting an angle between a lens plane LP of the camera 123 and an image plane IP of the camera 123. Here, the lens plane LP is defined as an imaginary plane passing through the optical center of the lens and perpendicular to the optical axis of the lens 123L. The image plane IP is defined as an imaginary plane on which a surface of the image sensor of the sensor portion 123S lies. The plane of focus POF is defined as an imaginary plane that is a set of points of focus. In other words, any object lying on the plane of focus POF is imaged sharply. In some embodiments, the tilting portion 123T can be used to adjust the lens plane LP and the image plane IP to not be parallel to each other. Also, the tilting portion 123T can be used to adjust the plane of focus POF to be parallel to the glass sheet GS. When the plane of focus POF is oriented in parallel to the glass sheet GS, it is possible to acquire an image of which the entire region is clear.

According to some embodiments, the lens 123L can be a telecentric lens. The telecentric lens denotes a lens whose entrance pupil or exit pupil is at infinity, which may reduce errors resulting from a position of the defect in the image or from the size of a defect in an image. Therefore, it is possible to obtain an image that accurately shows a size of an edge defect using the telecentric lens. According to some embodiments, the light source 124 may be a telecentric light source. It is possible to obtain a clear image of an edge of an accurate size using a telecentric light source that emits parallel rays of light.

Figure 2B:
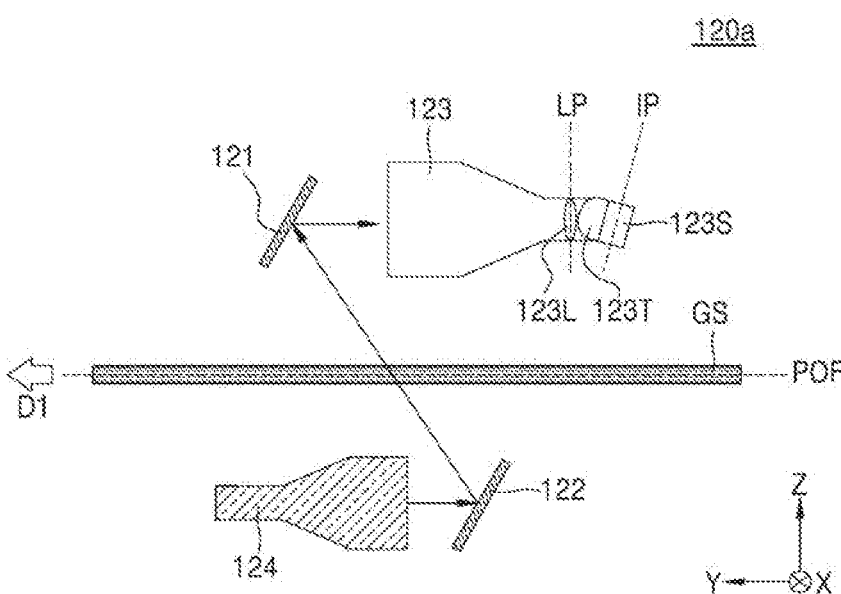
FIG. 2B is a diagram illustrating an optical system comprised in an apparatus for inspecting an edge of a glass sheet according to an embodiment of the disclosure.

FIG. 2B is a diagram illustrating an optical system comprised in an apparatus for inspecting an edge of a glass sheet according to an embodiment of the disclosure. Differences between the embodiment shown in FIG. 2A and this embodiment will be described below.

Referring to FIG. 2B, in some embodiments, an optical system 120a may further comprise a first mirror 121 and a second mirror 122. In other embodiments, an optical system 120a may further comprise either the first mirror 121 or the second mirror 122. The first mirror 121 and the camera 123 may be oriented so that the plane of focus POF becomes parallel to the glass sheet GS. For example, the optical axis of the lens 123L of the camera 123 is fixed in the direction Y parallel to the glass sheet GS, and it is possible to adjust a direction of light incident on the camera 123 by adjusting an orientation of the first mirror 121. The second mirror 122 and the light source 124 can be oriented so that light emitted from the light source 124 is reflected by the second mirror 122 and incident on the glass sheet GS in an oblique direction. For example, a direction in which the light source 124 emits light is fixed in a direction −Y parallel to the glass sheet GS, and it is possible to adjust a direction of light incident on the glass sheet GS by adjusting an orientation of the second mirror 122. In addition, adjustment of an orientation of the second mirror 122 may also adjust a direction of light incident on the camera 123. For example, instead of adjusting the orientation of the camera 123, the orientation of the second mirror 122 may be adjusted while the optical axis of the camera 123 is fixed in the direction Y parallel to the glass sheet GS.

The first mirror 121 and/or the second mirror 122 make it possible to reduce a size of the optical system 120a by arranging the camera 123 and the light source 124 in a small space, and to facilitate adjustment of a travel direction of light.

When the optical system 120 or 120a described with reference to FIG. 2A or 2B is applied to the apparatus 100 for inspecting an edge of a glass sheet in FIG. 1, a small edge defect may be detected, and a size of the edge defect may be measured. For example, the apparatus 100 for inspecting an edge of a glass sheet may detect an edge defect with a length of less than about 1 mm in one direction.

Figure 3:
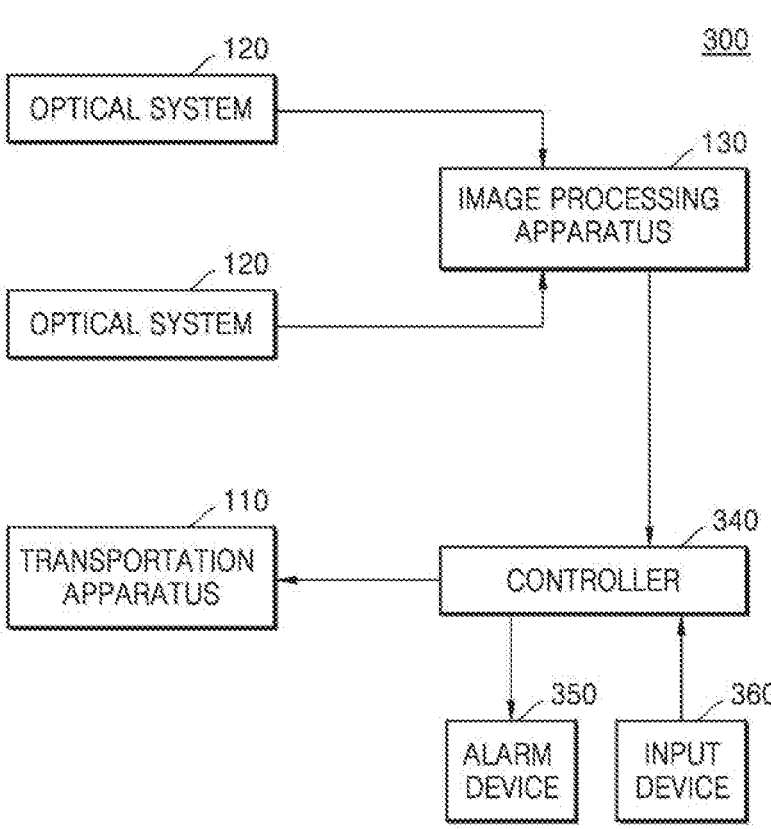
FIG. 3 is a block diagram of an apparatus for inspecting an edge of a glass sheet according to an embodiment of the disclosure.

FIG. 3 is a block diagram of an apparatus for inspecting an edge of a glass sheet according to an embodiment of the disclosure.

Referring to FIG. 3, an apparatus 300 for inspecting an edge of a glass sheet may comprise a transport device 110, two optical systems 120, an image processing device 130, and a controller 340.

One optical system 120 transmits an image of an edge of a glass sheet to the image processing device 130. The other optical system 120 transmits an image of an opposite edge of the glass sheet to the image processing device 130. The image processing device 130 analyses the received images to detect an edge defect of the glass sheet. In some embodiments, a display device of the image processing device 130 may show the captured images and an edge inspection result of the glass sheet. In some embodiments, a storage device of the image processing device 130 may store the captured images and the edge defect detection result.

In some embodiments, the image processing device 130 may determine whether the glass sheet to be inspected is defective based on the edge defect detection result. For example, it is possible to determine whether the glass sheet is defective according to a method 1000 of inspecting an edge of a glass sheet that will be described below with reference to FIGS. 10 and 11. The image processing device 130 transmits a determination result to the controller 340.

The controller 340 may be, for example, a programmable logic controller (PLC), and can be configured to control operation of the transport device 110. For example, when a determination result indicating that the glass sheet is defective is received from the image processing device 130, the controller 340 may stop operation of the transport device 110. When a determination result indicating that the glass sheet is non-defective is received from the image processing device 130, the controller 340 does not stop operation of the transport device 110.

In some embodiments, the controller 340 may be connected to an alarm device 350. When the determination result indicating that the glass sheet is defective is received from the image processing device 130, the controller 340 operates the alarm device 350 to notify a user that a defective glass sheet has been found.

In some embodiments, the controller 340 may also be connected to an input device 360. A user may select and input one of several options through the input device 360. When the user determines that, as a result of checking the glass sheet that has been determined to be defective, there is low probability that the glass sheet will be broken in a subsequent process, the user may select a pass option so that the glass sheet is passed. When the user determines that, as a result of checking the glass sheet that has been determined to be defective, there is high probability that the glass sheet will be broken in a subsequent process, the user may determine whether to remove the glass sheet immediately or later. When it is determined to immediately remove the glass sheet, the user may remove the glass sheet and then select a completion-of-removal option. When it is determined to remove the glass sheet later, the user may select a remove-later option without removing the glass sheet. When it is determined that the determination of the image processing device 130 is wrong as a result of checking the glass sheet that has been determined to be defective, the user may select a non-defective option.

The input device 360 may transmit input information to the controller 340. The controller 340 receives the input information and then resumes operation of the transport device 110. Also, the controller 340 may transmit a defectiveness determination result and the input information to an upper server.

Figure 4:
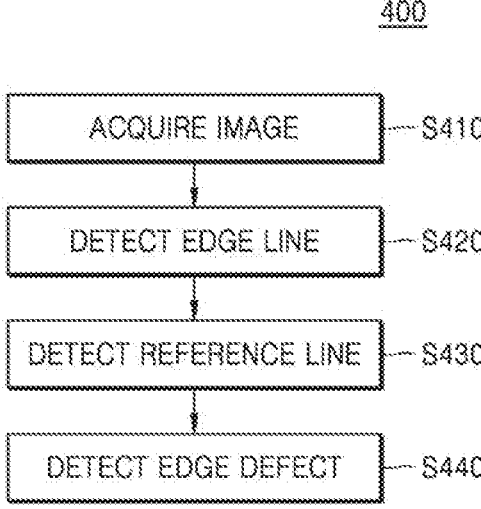
FIG. 4 is a flowchart illustrating a method of inspecting an edge of a glass sheet according to an embodiment of the disclosure.

FIG. 4 is a flowchart illustrating a method of inspecting an edge of a glass sheet according to embodiments of the disclosure. FIGS. 5A to 5D are diagrams illustrating each operation of the method of inspecting an edge of a glass sheet in FIG. 4.

Referring to FIG. 4, a method 400 of inspecting an edge of a glass sheet according to an embodiment of the disclosure comprises acquiring an image S410, detecting an edge line S420, detecting a reference line S430, and detecting an edge defect S440.

Figure 5A:
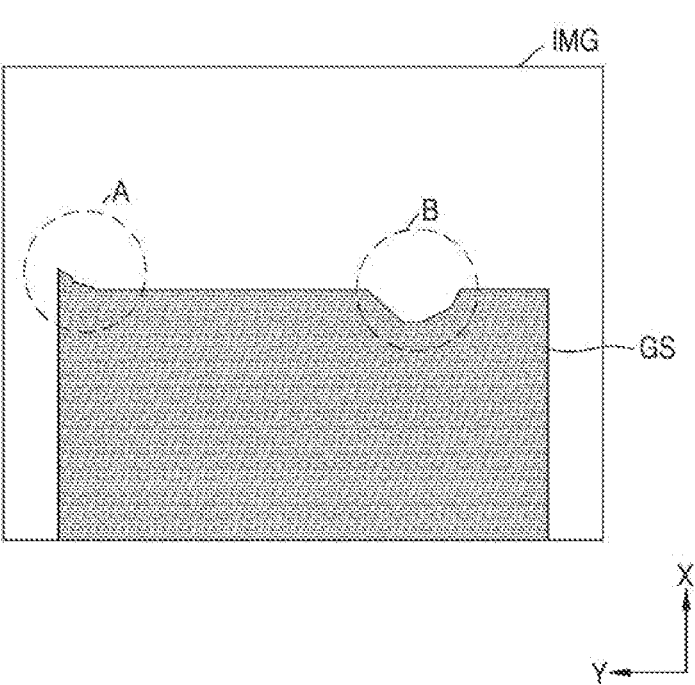
FIGS. 5A to 5D are diagrams illustrating each steps of the method of inspecting an edge of a glass sheet in FIG. 4.

Referring to FIGS. 4 and 5A, in the step S410 of acquiring an image, an image IMG of a glass sheet GS is acquired. An optical system may be used to take images of the glass sheet GS. For example, an image IMG of the glass sheet GS may be taken using the optical system 120 or 120a shown in FIG. 2A or 2B. The image IMG may show at least a part of an edge of the glass sheet GS. Some glass sheets GS may comprise edge defects. Herein, an edge defect denotes a defect present at an edge of a glass sheet GS. Edge defects may comprise, for example, a protruded defect A and an indented defect B. Herein, the protruded defect A denotes a portion protruding out from an edge which otherwise has no defect. Herein, the indented defect B denotes a portion extending inward in from an edge which otherwise has no defect.

Figure 5B:
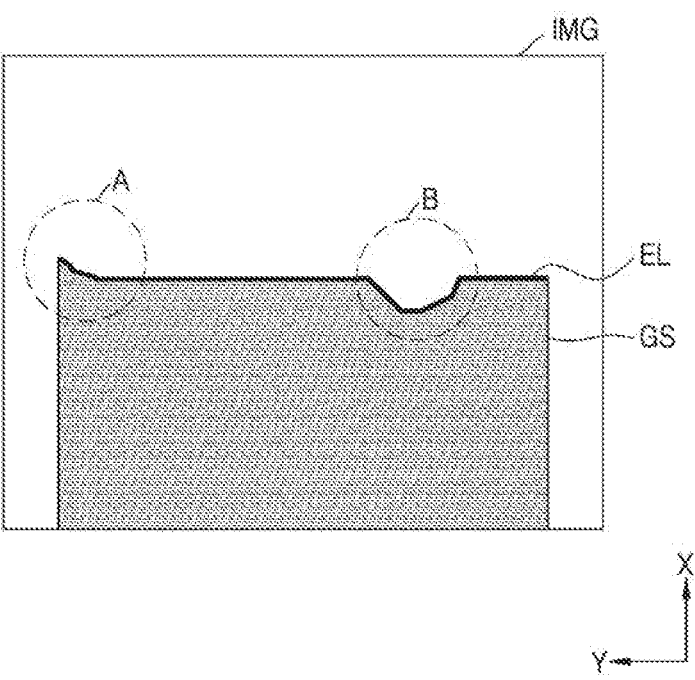

Referring to FIGS. 4 and 5B, in the step S420 of detecting an edge line, an edge line EL of the glass sheet GS is detected from the image IMG. The detecting an edge line EL may comprise applying an edge filter to the image IMG. For example, in the orientation shown in FIG. 5B a vertical edge filter may be applied to detect the edge line EL of an edge extending in the horizontal direction Y. The edge line EL may correspond to one of a plurality of edge of the glass sheet.

Figure 5C:
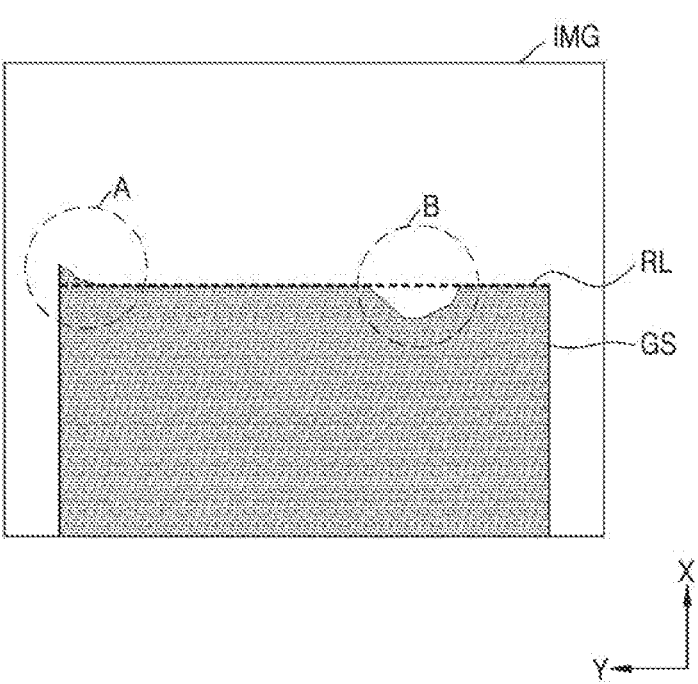

Referring to FIGS. 4 and 5C, in the step S430 of detecting a reference line, a reference line RL may be detected from the edge line EL of FIG. 5B. For example, the reference line RL may be detected by applying line fitting to the edge line EL. In some embodiments, the line fitting may employ random sample consensus (RANSAC). Using RANSAC, it is possible to reduce distortion of the reference line RL caused by the presence of the edge defects A and B or shaking of the moving glass sheet GS. In this way, it is possible to obtain the reference line RL approximating an edge having neither the edge defect A nor the edge defect B.

Figure 5D:
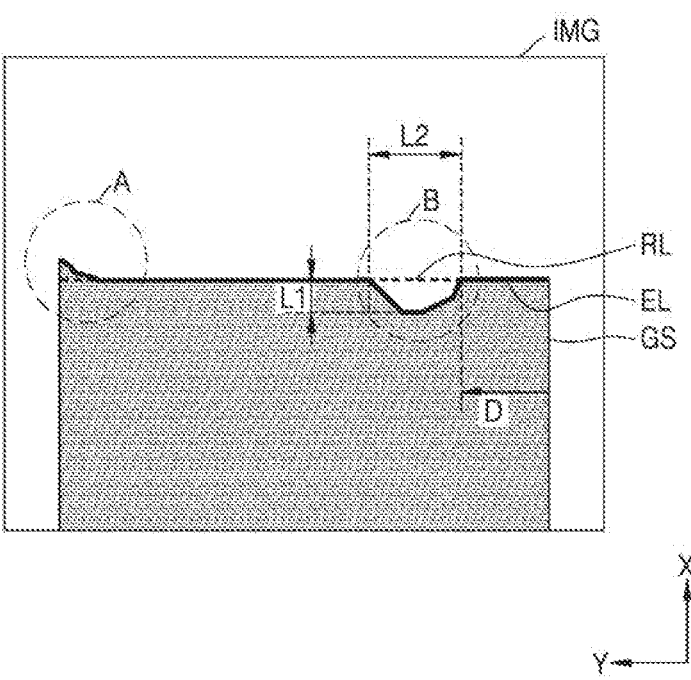

Referring to FIGS. 4 and 5D, in the step S440 of detecting an edge defect, the edge line EL and the reference line RL may be compared. It is possible to detect the protruded defect A that is a part of the edge line EL protruding from the reference line RL in an outward direction X of the glass sheet GS or the indented defect B that is a part of the edge line EL extending inward from the reference line RL in the direction –X of the glass sheet GS. In the step S440 of detecting an edge defect, at least one of a type, size, and position of a defect may be detected. Here, the type of a defect may be the protruded defect A or the indented defect B. The size of a defect may be represented by a length L1 of a defect in the direction X and a length L2 of the defect in the orthogonal direction Y. The position of a defect may be a distance D from one end of the glass sheet GS to a position at which the defect begins along the extension direction Y of the glass sheet GS.

Figure 6:
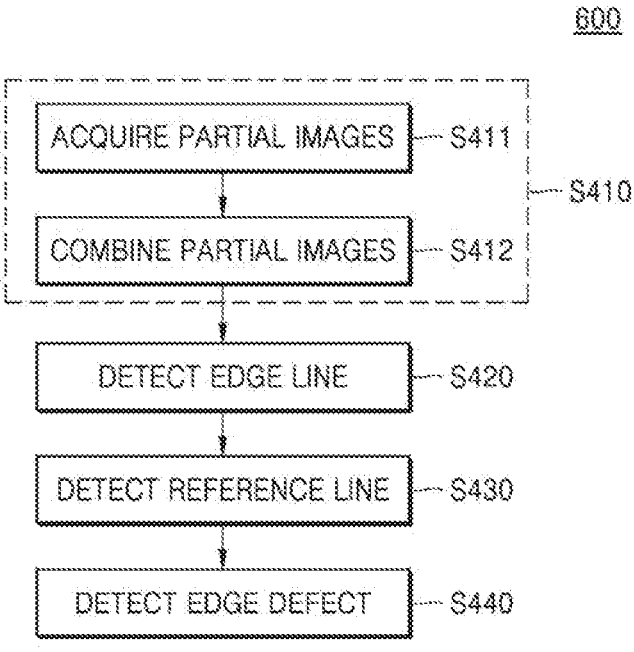
FIG. 6 is a flowchart illustrating a method of inspecting an edge of a glass sheet according to an embodiment of the disclosure.
Figure 7A:
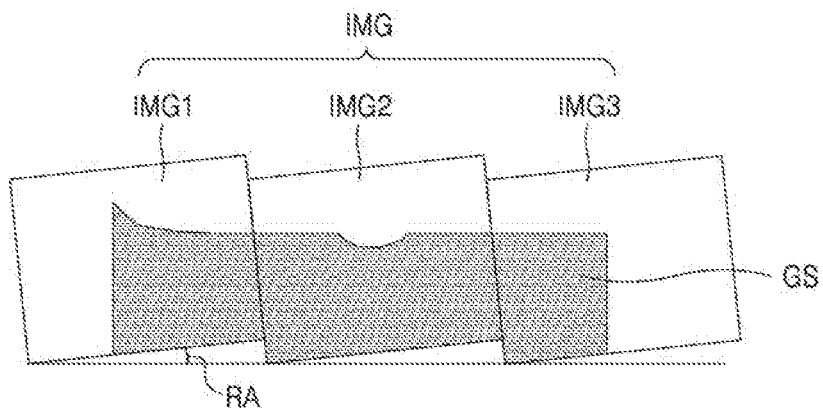
FIGS. 7A and 7B are diagrams illustrating some steps of the method of inspecting an edge of a glass sheet in FIG. 6.
Figure 7B:
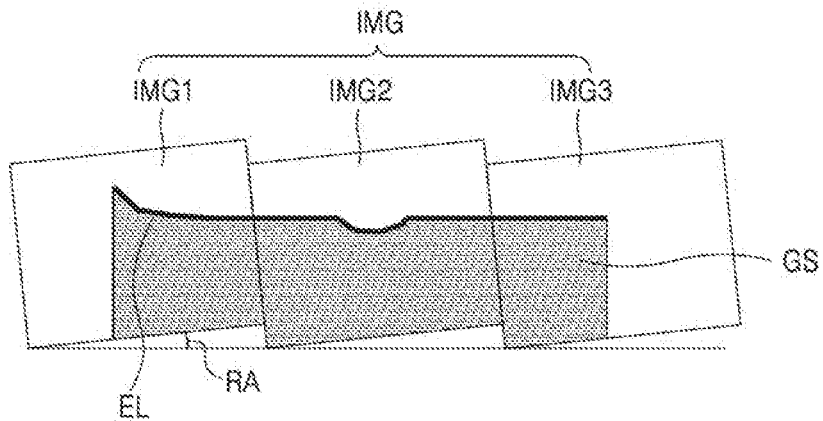

FIG. 6 is a flowchart illustrating a method of inspecting an edge of a glass sheet according to embodiments of the disclosure. FIGS. 7A and 7B are diagrams illustrating steps of the method of inspecting an edge of a glass sheet in FIG. 6. Differences from the embodiment illustrated in FIGS. 4 to 5D will be described below.

Referring to FIGS. 6 and 7A, a method 600 of inspecting an edge of a glass sheet comprises the step S410 of acquiring an image of an edge that in turn comprises the step S411 of acquiring partial images and the step S412 of combining the partial images. In the step S411 of acquiring partial images, a plurality of images IMG1 to IMG3 of each portions of a glass sheet GS may be acquired. For example, as shown in FIG. 1, the partial images IMG1 to IMG3 of the moving glass sheet GS is sequentially taken at predetermined time intervals using the fixed optical system 120. Each of the partial images IMG1 to IMG3 may show only a portion of an edge of the glass sheet GS. In the drawing, three partial images IMG1 to IMG3 are taken. However, the number of partial images is not limited to three and may vary according to a size of the glass sheet GS.

In the step S412 of combining the partial images, the partial images IMG1 to IMG3 may be combined into one image IMG. Each of the partial images IMG1 to IMG3 may show a portion of an edge of the glass sheet GS. The combined image IMG may show all portions of an edge of the glass sheet GS. To combine the partial images IMG1 to IMG3 into the single image IMG, the partial images IMG1 to IMG3 may be joined side by side. In some embodiments, when the optical system 120 shown in FIG. 1 and the movement direction D1 of the glass sheet GS are not aligned, the partial images IMG1 to IMG3 may be joined as shown in FIG. 7A in consideration of a rotation angle RA caused by the misalignment.

Referring to FIGS. 6 and 7B, in the step S420 of detecting an edge line, one edge line EL may be detected from the combined image IMG.

Since the method 600 of inspecting an edge of a glass sheet according to embodiments of the disclosure makes it possible to detect a defect by combining the partial images IMG1 to IMG3, it is also possible to inspect a large glass sheet GS regardless of size of the glass sheet GS.

Figure 8:
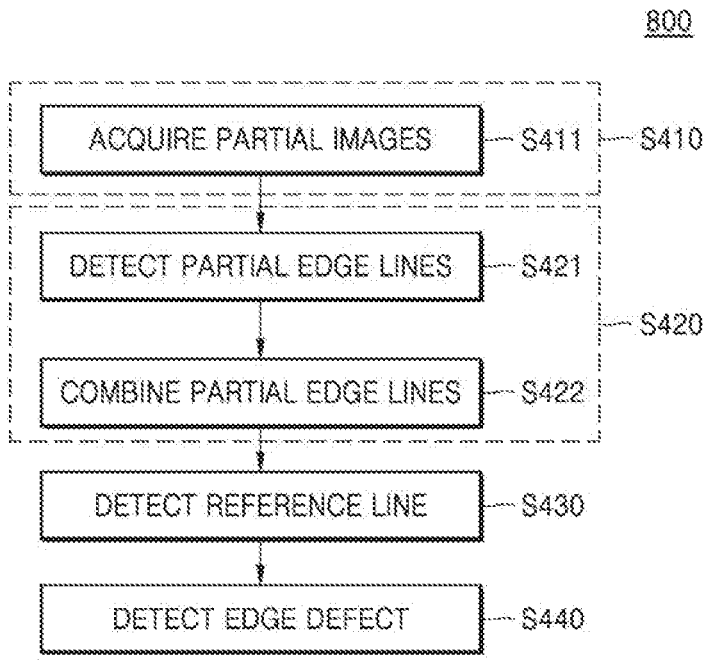
FIG. 8 is a flowchart illustrating a method of inspecting an edge of a glass sheet according to an embodiment of the disclosure.
Figure 9A:
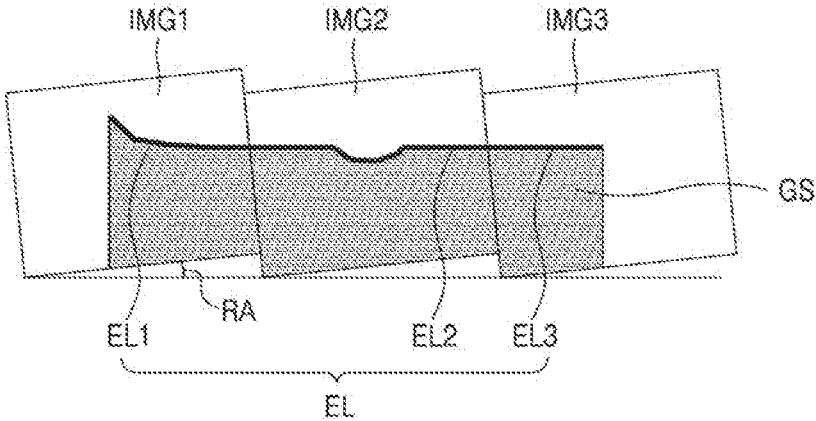
FIGS. 9A and 9B are diagrams illustrating some steps of the method of inspecting an edge of a glass sheet in FIG. 8.
Figure 9B:
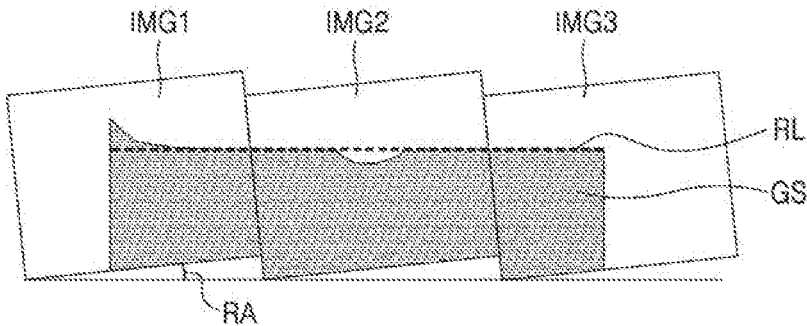

FIG. 8 is a flowchart illustrating a method of inspecting an edge of a glass sheet according to embodiments of the disclosure. FIGS. 9A and 9B are diagrams illustrating some steps of the method of inspecting an edge of a glass sheet in FIG. 8. Differences from the embodiment illustrated in FIGS. 4 to 5D will be described below.

Referring to FIG. 8, the step S410 of acquiring an image comprises acquiring partial images in step S411. The step S411 of acquiring partial images is the same as that described with reference to FIG. 6.

Referring to FIGS. 8 and 9A, the step S420 of detecting an edge line comprises the step S421 of detecting partial edge lines and the step S422 of combining the partial edge lines. In the step S421 of detecting partial edge lines, partial edge lines EL1 to EL3 may be detected from partial images IMG1 to IMG3, respectively. Each of partial edge lines EL1 to EL3 may correspond to respective portions of the edge of the glass sheet GS.

In the step S422 of combining the partial edge lines, the partial edge lines EL1 to EL3 may be combined into one edge line EL. In some embodiments, the edge line EL may correspond to one of a plurality of edges of a glass sheet GS.

Referring to FIGS. 8 and 9B, in the step S430 of detecting a reference line, a reference line RL may be detected from the edge line EL (see FIG. 9A). Since reference lines are not separately detected from the partial edge lines EL1 to EL3 and the single reference line RL is detected from the combined single edge line EL, it is possible to detect the reference line RL that better approximates an edge having no defect. Therefore, small edge defects may be detected more accurately.

Since the method 800 of inspecting an edge of a glass sheet according to embodiments of the disclosure makes it possible to detect a defect by combining the partial images IMG1 to IMG3, it is also possible to inspect a glass sheet GS regardless of size of the glass sheet GS. Also, since the reference line RL is detected from the single edge line EL obtained by combining the partial edge lines EL1 to EL3, small edge defects may be detected more accurately.

Figure 10:
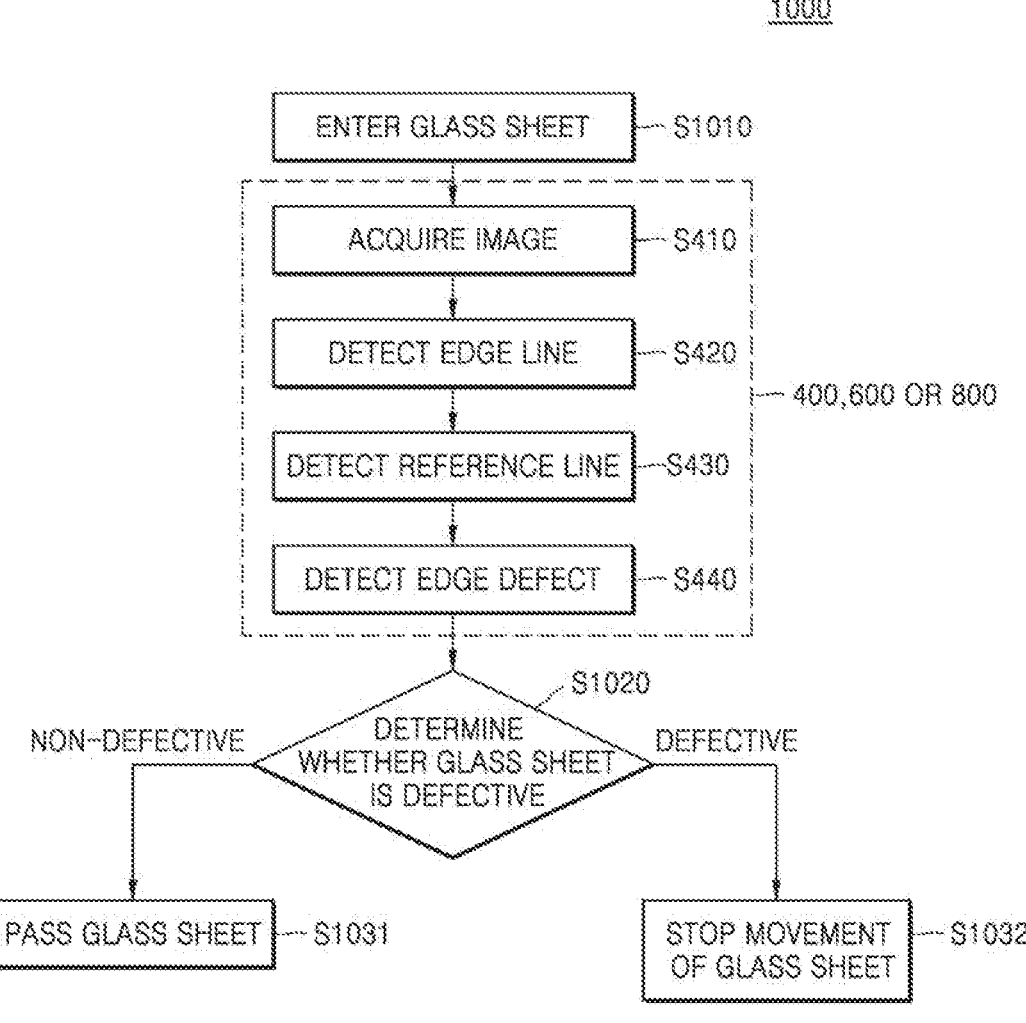
FIG. 10 is a flowchart illustrating a method of inspecting an edge of a glass sheet according to an embodiment of the disclosure.
Figure 11:
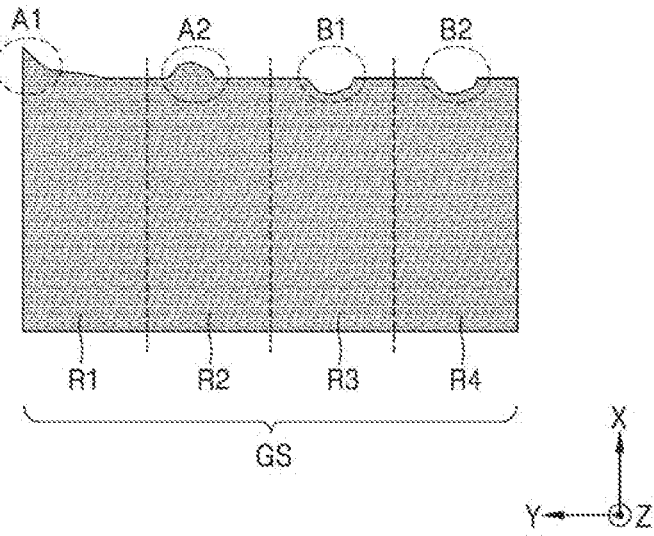
FIG. 11 is a diagram illustrating a step of determining a defect of a glass sheet in FIG. 10.

FIG. 10 is a flowchart illustrating a method of inspecting an edge of a glass sheet according to further embodiments of the disclosure. FIG. 11 is a diagram illustrating a step of determining a defect of a glass sheet in FIG. 10.

Referring to FIG. 10, in the step S1010 of entering a glass sheet, a glass sheet GS may be entered into an apparatus for inspecting an edge of the glass sheet. For example, as shown in FIG. 1, the transport device 110 may be used to enter the glass sheet GS into a section in which the optical system 120 is installed.

Subsequently, the step S410 of acquiring an image, the step S420 of detecting an edge line, the step S430 of detecting a reference line, and the step S440 of detecting an edge defect may proceed. Steps from the step S410 of acquiring an image to the step S440 of detecting an edge defect may be the same as those in any one of the methods 400, 600, and 800 of inspecting an edge of a glass sheet described with reference to FIGS. 4, 6, and 8.

Referring to FIGS. 10 and 11, in the step S1020 of determining a defect of a glass sheet, it may be determined whether the glass sheet GS is defective based on a size of an edge defect measured in the step S440 of detecting an edge defect. For example, when the glass sheet GS comprises at least one edge defect with a size larger than a predetermined value, the glass sheet GS may be determined to be defective.

For example, when the glass sheet GS comprises at least one edge defect with a length larger than 5 mm in the X direction or larger than 3 mm in the Y direction, the glass sheet GS may be determined to be defective. It should be noted, however, that these length values are illustrative only, and the predetermined size values used to determine if a glass sheet is defective may vary.

In some embodiments, the predetermined value may vary depending on a type of an edge defect. For example, when the glass sheet GS comprises at least one of a protruded defect A1 or A2 with a length larger than 5 mm in the X direction or larger than 5 mm in the Y direction or an indented defect B1 or B2 with a length larger than 4 mm in the X direction or larger than 4 mm in the Y direction, the glass sheet GS may be determined to be defective.

In some embodiments, the predetermined value may vary depending on a position of an edge defect. For example, the glass sheet GS may comprise a plurality of regions R1 to R4, and the predetermined value may vary depending on the regions. For example, when the glass sheet GS comprises at least one defect A1 with a length larger than 4 mm in the X direction or larger than 4 mm in the Y direction and which defect is present in the first region R1 or the defect A2 with a length larger than 5 mm in the X direction or larger than 5 mm in the Y direction and which defect is present in the second region R2, the glass sheet GS may be determined to be defective.

The probability of breakage in a subsequent process may depend not only on a size of a defect but also on a position and a type of the defect. Using information on a position and/or a type of a defect as well as a size of the defect, it is possible to determine more accurately a glass sheet GS that has a high probability of breaking in a subsequent process.

When the glass sheet GS is determined to be non-defective, the glass sheet GS may pass through the inspection apparatus during step S1031. When the glass sheet GS is determined to be defective, movement of the glass sheet GS may be stopped at step S1032. A user of the inspection apparatus may check a state of the glass sheet GS that has been determined to be defective and then determine whether to pass the glass sheet GS or remove the glass sheet GS from the transport device. When the glass sheet GS that has been determined to be defective is determined by the user to have a low probability of breaking in a subsequent process, the user may resume movement of the glass sheet GS, and the glass sheet GS may pass through the inspection apparatus. When the glass sheet GS that has been determined to be defective is determined by the user to have a high probability of breaking in a subsequent process, the glass sheet GS may be removed from the transport device. The glass sheet GS may be removed from the transport device immediately at a point in time at which movement of the glass sheet GS stops or after movement of the glass sheet GS resumes. When the glass sheet GS that has been determined to be defective is determined by the user to be non-defective, the user may resume movement of the glass sheet GS, and the glass sheet GS may pass through the inspection apparatus.

The method 1000 of inspecting an edge of a glass sheet according to embodiments of the disclosure makes it possible to determine glass sheets having a high probability of breaking in a subsequent process and to remove such glass sheets from a transport device. Therefore, it is possible to reduce the down time of the transportation device to clear away pieces of a glass sheet on the transportation device due to breakage of the glass sheet in a subsequent process such as a finishing process.

It will be apparent to those skilled in the art that various modifications and variations can be made to the disclosed embodiments without departing from the spirit and scope of the disclosure. Thus it is intended that the present disclosure cover the modifications and variations of these embodiments provided they come within the scope of the appended claims and their equivalents.

What is claimed is:

1. A method of inspecting an edge of a glass sheet, the method comprising:

directing light onto an edge portion of the glass sheet with a light source, wherein the light is incident on the edge portion of the glass sheet in a direction oblique to a first side of the glass sheet;

acquiring an image of the glass sheet from a camera disposed on a second side of the glass sheet opposite from the light source, wherein the camera senses the light incident on the glass sheet in the direction oblique to the first side of the glass sheet;

detecting an edge line of the glass sheet from the image, the edge line corresponding to an actual edge of the glass sheet;

determining a reference line based on the edge line; and detecting an edge defect of the glass sheet by comparing the edge line and the reference line, wherein detecting an edge defect of the glass sheet comprises detecting at least one of a type of the edge defect, a size of the edge defect, and a position of the edge defect, wherein:

directing light onto the edge portion of the glass sheet comprises reflecting and directing the light onto the glass sheet in the direction oblique to the first side of the glass sheet; and acquiring the image of the glass sheet from the camera comprises adjusting an orientation of a plane of focus of the camera such that the plane of focus of the camera is parallel to the glass sheet and orienting the light incident on the glass sheet in the direction oblique to the first side of the glass sheet such that the light is reflected towards the camera.

2. The method of claim 1, wherein the acquiring the image of the glass sheet comprises acquiring a plurality of partial images of portions of the glass sheet.

3. The method of claim 2, wherein the detecting the edge line comprises detecting partial edge lines from each of the partial images.

4. The method of claim 3, wherein the detecting the edge line further comprises combining the partial edge lines into one edge line.

5. The method of claim 1, wherein the detecting the reference line comprises applying line fitting to the edge line.

6. The method of claim 5, wherein the line fitting employs a random sample consensus method.

7. The method of claim 1, wherein the edge line corresponds to one of a plurality of edges of the glass sheet.

* * * * *